United States Patent
Stein

(10) Patent No.: US 7,942,066 B1
(45) Date of Patent: May 17, 2011

(54) NON-INTRUSIVE TWO-PHASE FLOW MEASUREMENT SYSTEM

(75) Inventor: Elizabeth V Stein, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 12/887,763

(22) Filed: Sep. 22, 2010

(51) Int. Cl.
*G01F 1/74* (2006.01)

(52) U.S. Cl. .................................. 73/861.04

(58) Field of Classification Search ............ 73/861.04, 73/861.26, 861.23, 861.22, 861.24, 24.01
See application file for complete search history.

(56) References Cited

U.S. PATENT DOCUMENTS

| | | | | |
|---|---|---|---|---|
| 4,240,299 A * | 12/1980 | Joy et al. | ..................... | 73/861.23 |
| 5,880,377 A * | 3/1999 | Celik | ......................... | 73/861.22 |
| 6,912,918 B1 * | 7/2005 | Lynnworth et al. | ........ | 73/861.26 |
| 7,032,432 B2 * | 4/2006 | Gysling et al. | ............... | 73/24.01 |

* cited by examiner

*Primary Examiner* — Jewel Thompson
(74) *Attorney, Agent, or Firm* — John Ryznic

(57) ABSTRACT

A process for determining a fluid flow velocity and then a mass flow rate of a cryogenic fluid in which a Helmholtz resonator is used to detect a presence of a two-phase flow in a conduit. The process first measures a frequency of the fluid flow, then determines a speed of sound of the fluid from the frequency, then measures the temperature of the fluid flow, and from the speed of sound and the temperature determines a quality of the fluid flow (liquid or vapor), and from the frequency and the fluid quality determines a Strouhal Number. The fluid flow velocity is found from an equation relating the frequency and a diameter of the surface area to the Strouhal Number. The mass flow rate is found from the fluid flow velocity and the temperature.

6 Claims, 2 Drawing Sheets

US 7,942,066 B1

NON-INTRUSIVE TWO-PHASE FLOW MEASUREMENT SYSTEM

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a liquid fuel rocket engine, and more specifically to monitoring for two-phase flow in a rocket engine feed line.

2. Description of the Related Art Including Information Disclosed Under 37 CFR 1.97 and 1.98

A liquid fuel rocket engine burns a fuel with an oxidizer in a combustion chamber of a rocket nozzle to produce thrust. The fuel (such as liquid hydrogen) is stored in a fuel tank while the oxidizer (such as liquid oxygen) is stored in an oxidizer tank. Both tanks are typically pressurized to force the liquid from the tank into an entrance to a turbopump that then increase the pressure for delivery to the combustion chamber. The fuel is delivered into the fuel turbopump and the oxidizer is delivered into the oxidizer turbopump.

The fuel and oxidizer reservoir tanks are pressurized in order to deliver the liquids into the inlet of an inducer. The inducer is a low pressure (relative for rocket engines) pump that increases the pressure of the liquid (LOX or H2) for delivery into the centrifugal pump that produces the high pressure for discharge into the combustion chamber. The higher the reservoir pressure, the less likely that cavitation will occur within the inducer. However, the higher the reservoir tank pressure the thicker the tank walls must be in order to withstand the higher pressures. Thicker reservoir walls results in heavier reservoir tank and thus heavier vehicle weight.

Optimal performance in rocket engine turbo-pumps depends upon the condition of the inlet propellant flow, in terms of both a uniform velocity profile and the quality of the fluid. Local bubbles in rocket engine pump feed lines serve as the inception sites for cavitation in the pump. These bubbles further grow into vapor cavities as the flow gains velocity just downstream of the inducer leading edge, where the local pressure can drop below vapor pressure. The further the onset of cavitation can be delayed, the higher the operating suction specific speed of a pump. Thus knowledge of the upstream flow quality is critical to the overall health and performance of the engine.

Current state-of-the-art technologies to measure two-phase flow include optical sensors or capacitive sensors. Capacitive sensors rely on the difference in dielectric constant between the liquid and vapor. Optical sensors depend on the difference in index of refraction between liquid and vapor.

Disadvantages of capacitive sensors include sensitivity to void fraction distribution (flow regime, whether "bubbly" or "slug"), changes in electrical properties of the fluid with respect to temperature, and presence of local electromagnetic field all affect the accuracy of the measurement. These sources of uncertainty have been calculated to be on the order of +/−6% in a laboratory test section. The presence of local electromagnetic field from other equipment also requires substantial sensor shielding.

The accuracy of optical sensors depends on knowledge of the net liquid flow rate. If this value is known typical uncertainties are +0/−6%, otherwise uncertainties as high as +0/−16% have been reported. Another major limitation of optical sensors is the size of the bubbles, with diminishing bubble size causing a large underestimation (~50% under) of the vapor concentration. This inaccuracy is particularly evident in the bubble flow regime, where tiny bubbles are interspersed throughout the fluid. The limitations of point source fiber optic sensors can be overcome by employing a "plane of light".

Ultrasonic flow meters represent current state-of-the-art technology which uses sound to measure flow. However, the coldest temperature demonstrated for cryogenic fluid flow is around −200 degrees Celsius, cold enough for LOX but not LH2. Ultrasonic flow meters have many sources of uncertainty, including fluid sound speed, flow profile, and "installation" sources of uncertainty (such as pipe wall, lining, roughness, and cross talk). One of their major sources of uncertainty is two-phase flow. The presence of vapor bubbles affects the way sound waves travel through the fluid medium.

An existing embodiment of a cryogenic two-phase flow meter also uses an acoustic signal to determine flow velocity. While capacitive sensors are essentially thin strips of two conductive materials and optical fiber sensors can be manufactured very small (125 µm diameter), the acousto-optic sensor appears to require a large amount of additional equipment, which translates to added weight on the launch vehicle.

BRIEF SUMMARY OF THE INVENTION

A process and an apparatus for a non-intrusive way to detect and quantify two-phase (liquid/vapor) flow in pipes and lines. Instead of relying on sensing visual or electric properties, sense of sound and frequency are used. The flow of a liquid/vapor mixture through a pipe has a distinct sound, compared to the flow of pure liquid. A microphone (or acoustic emission probe) can be tuned to detect the change in sound that occurs when two-phase flow begins. However, when monitoring for two-phase flow in a rocket engine feed line, the engine and launch vehicle will be vibrating which can distort the signal. In such a situation, a Helmholtz resonator can act as an isolator of the two-phase flow signal.

The process includes measuring the frequency of the fluid flow indicated from the Helmholtz resonator, from the measured frequency determining the speed of sound, from the speed of sound and a measured fluid temperature upstream, determining a quality of the fluid (from quality of zero for pure liquid to quality of one for pure vapor). A map stored in a memory includes a 3 dimensional array relating frequency, fluid quality and a Strouhal number (St). With the quality of the fluid and the frequency, from the 3-D map one can get the Strouhal number. From the equation $U=(f*D)/St$ one can get the velocity (U) of the fluid. From the velocity (U) and the measured temperature (T), one can then get the mass flow rate of the fluid, knowing the pipe diameter. The density as a function of temperature and quality must also be known since mass flow rate is a function of the density times the velocity times the cross sectional area.

DETAILED DESCRIPTION OF THE INVENTION

Figure 1:
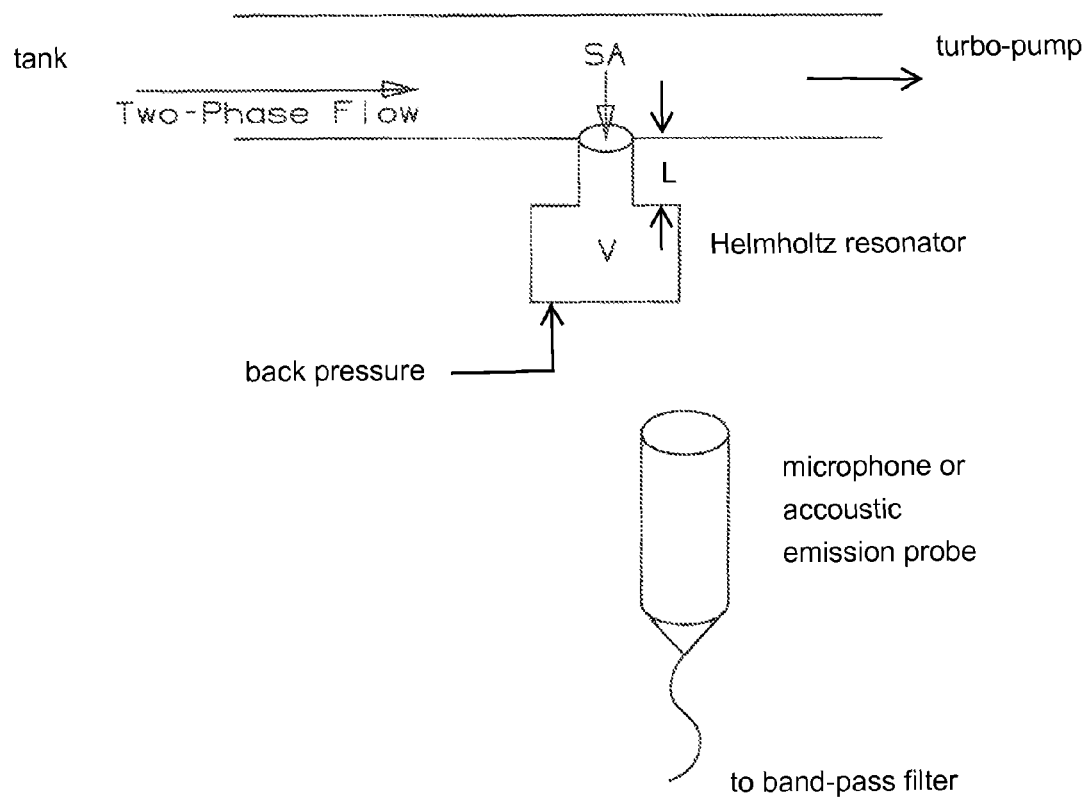
FIG. 1 shows a schematic view of a feed line with a Helmholtz resonator of the present invention.

The Helmholtz resonator detector is used in a feed line to a turbopump in a rocket engine in order to detect for a two-phase flow. FIG. 1 shows a section of a feed line to carry a liquid from the tank to the turbopump. The feed line can be for the oxidizer or the fuel. Located in the feed line near to the inlet to the turbopump (most likely an inducer on the turbopump inlet) is the Helmholtz resonator. The Helmholtz resonator includes an inlet tube with an opening with a surface area (SA) that opens into the feed line and also opens into a cavity having a volume (V). The inlet tube has a length (L). A microphone or an acoustic emission probe is located near to the bottom side (but does not necessarily have to be the bottom) of the cavity to pick up a sound being emitted from the cavity. The microphone or probe is connected to a band-pass filter. The cavity is a closed cavity.

The flow of a liquid/vapor mixture through a pipe has a distinct sound, compared to the flow of pure liquid. A microphone (or acoustic emission probe) can be tuned to detect the change in sound that occurs when two-phase flow begins. However, when monitoring for two-phase flow in a rocket engine feed line, the engine and launch vehicle will be vibrating which can distort the signal. In such a situation, a Helmholtz resonator can act as an isolator of the two-phase flow signal (FIG. 1).

The Helmholtz resonator is sized such that the range of frequencies it is tuned for corresponds to the change in the speed of sound as the quality of the flow changes from all liquid to all vapor. The equation to size the Helmholtz resonator is:

$$f = \frac{c}{2\pi} \sqrt{\frac{S.A.}{V*L}}$$

where f is the frequency of the resonator, c is the speed of sound of the fluid passing by the opening, S.A. is the surface area of the opening, L is the length of the "neck", and V is the cavity volume.

The speed of sound of hydrogen, as it changes from a quality of 0 (liquid) to a quality of 1 (vapor) at a constant temperature (such as −420° F.), decreases by almost 200%. Therefore, as the quality of the flow changes, so will the resonant frequency, even when the velocity in the line remains constant. The change in frequency can be used to quantify the amount of two-phase flow, while the upper and lower frequency limits (corresponding to fully liquid and fully vapor flow) can be programmed into a band-pass filter, so no external noise from the launch vehicle pollutes the signal from the flow.

Optimization of the proposed Helmholtz two-phase flow sensor can be readily achieved due to its simplistic design. The primary variables to be traded are surface area of the opening, the length of the "neck", and the volume of the cavity. From a systems perspective, minimizing both the surface area and the volume is beneficial (small size for less weight). However, minimization of these two variables has opposing effects on the frequency range, with the former correlating to lower values and the latter to higher ones. Of course, whether to optimize the sensor for lower or higher frequencies depends on the sensitivity of the microphone and sampling rate of the data acquisition system. Also, another limitation on size comes from the requirement that the sound impinging wavelength has to be much smaller than the surface area (or the "neck" length) for the resonant frequency formula to hold.

Another possible measurement that could be backed out of the sensor is the fluid velocity. This measurement would require characterization of the sensor's Strouhal number at various flow rates and fluid qualities (from all liquid to all vapor). The Strouhal number is a non-dimensional frequency of the system, and there exist a value that is optimal to create the largest displacement of the volume of fluid in the "neck". Imagine blowing air over a bottle, when the optimal Strouhal number is reached, the intensity of the sound increases. The equation for the Strouhal number (St) is:

$$St = \frac{f*D}{U}$$

where D is the diameter of the surface area shown in FIG. 1, and U is the velocity of the flow passing over the surface area. The microphone would measure the frequency of vibration, and the diameter is a known value. If the Strouhal number (St) has been previously characterized, the velocity of the flow U is easily calculated. In fact, measurements of the fluid quality and velocity can be combined with a separate fluid temperature measurement to determine the fluid density, thus allowing calculation of the mass flow rate.

The apparatus and process of the present invention incorporates the Two-Phase Flow Measurement System into an engine health management system. In addition to combining the quality and velocity data with an upstream measurement of temperature, accelerometers can be placed on the pipe, to measure local vibrations. The engine health management system could then employ an algorithm using data fusion on the relationship between sound pressure level (SPL) oscillations of the Helmholtz resonator and local vibrations of the pipe due to its external environment (i.e. the launch vehicle and engine vibrations). The Two-Phase Flow Measurement System of the present invention provides a simple solution to determining fluid quality and velocity.

Figure 2:
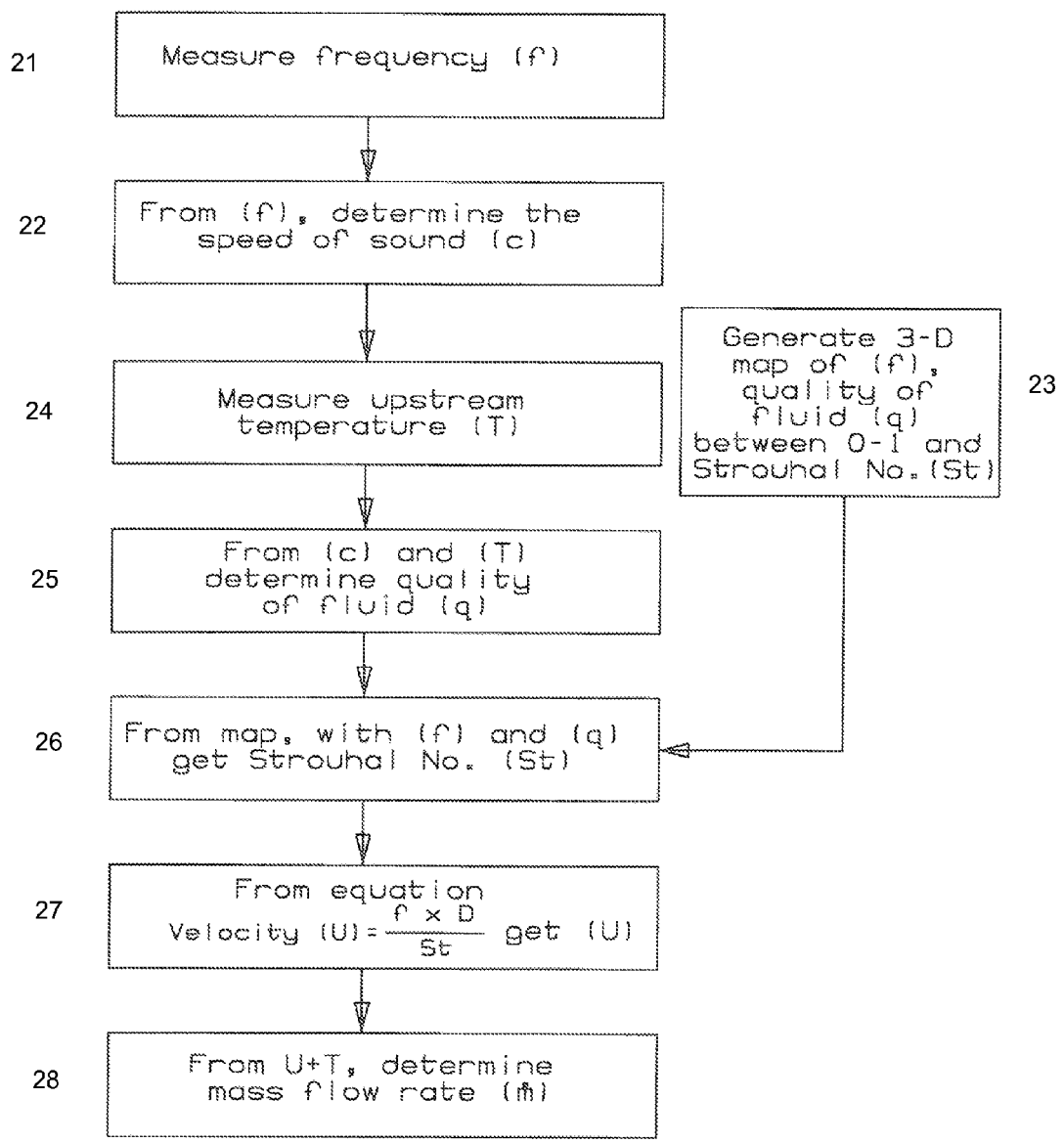
FIG. 2 shows a flow chart for the process of determining a mass flow rate according to the present invention.

The process of measuring a mass flow rate (m-dot) from a flow frequency, speed of sound, fluid quality, Strouhal number, and temperature according to the present invention is shown by the flow chart in FIG. 2. First, the frequency (f) of the fluid flow is measured from the Helmholtz resonator (step 21). From the frequency (f), the speed of sound (c) is determined (step 22). A 3-D Map relating the frequency (f) with a quality of the fluid (q) from a value of zero for a liquid to a value of one for a pure vapor and a Strouhal Number (St) is known beforehand (or generated a priori) in order that one of these values can be found when the other two of the three values are known (step 23). An upstream temperature (T) of the fluid flow is measured (step 24). From the value for the speed of sound (c) and the temperature (T), the quality of the fluid (q) with a number between zero (all liquid) and one (all vapor) is determined (step 25). With the frequency (f) and the quality (q) of the fluid known, from the 3-D Map the value of the Strouhal Number (St) is found (step 26). From the equation U=(f*D)/St where U is the velocity, find the velocity (U) (step 27) based on the known values of (f, D, and St). From the velocity (U) and the known value of the temperature (T), determine the mass flow rate (m-dot) (step 28).

I claim the following:

1. A process for measuring a fluid flow velocity of a cryogenic fluid within a rocket engine, the process comprising the steps of:
   measuring a frequency of the fluid flow;
   from the frequency, determine a speed of sound in the fluid flow;
   measure an upstream temperature of the fluid flow;
   from the speed of sound and the temperature, determine a quality of the fluid from in a range from all liquid to all vapor;
   from the frequency and the quality of the fluid flow, determine a Strouhal number; and,
   from the frequency and the Strouhal Number and a diameter of the surface area of the fluid flow, determine a fluid flow velocity.

2. The process for measuring a fluid flow velocity of claim 1, and further comprising the steps of:
   the step of determining the Strouhal Number includes generating a 3-D map relating frequency and quality of the fluid flow with a Strouhal Number.

3. The process for measuring a fluid flow velocity of claim 1, and further comprising the step of:
   the step of determining the fluid flow velocity includes solving an equation of $U=(f*D)/St$.

4. A process for measuring a mass flow rate of a cryogenic fluid within a rocket engine, the process comprising the steps of:
   measuring a frequency of the fluid flow;
   from the frequency, determine a speed of sound in the fluid flow;
   measure an upstream temperature of the fluid flow;
   from the speed of sound and the temperature, determine a quality of the fluid from in a range from all liquid to all vapor;
   from the frequency and the quality of the fluid flow, determine a Strouhal number;
   from the frequency and the Strouhal Number and a diameter of the surface area of the fluid flow, determine a fluid flow velocity; and,
   from the fluid flow velocity and the temperature, determine the mass flow rate of the fluid.

5. The process for measuring a mass flow rate of claim 4, and further comprising the step of:
   the step of determining the Strouhal Number includes generating a 3-D map relating frequency and quality of the fluid flow with a Strouhal Number.

6. The process for measuring a fluid flow velocity of claim 1, and further comprising the step of:
   the step of determining the fluid flow velocity includes solving an equation of $U=(f*D)/St$.

* * * * *